(12) United States Patent
Takeuchi

(10) Patent No.: US 12,459,769 B2
(45) Date of Patent: Nov. 4, 2025

(54) SHEET CONVEYING APPARATUS AND IMAGE FORMING APPARATUS

(71) Applicant: CANON KABUSHIKI KAISHA, Tokyo (JP)

(72) Inventor: Masaaki Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 18/334,219

(22) Filed: Jun. 13, 2023

(65) Prior Publication Data

US 2023/0416030 A1   Dec. 28, 2023

(30) Foreign Application Priority Data

Jun. 24, 2022   (JP) .................... 2022-101534

(51) Int. Cl.
*B65H 7/06*     (2006.01)
(52) U.S. Cl.
CPC ......... *B65H 7/06* (2013.01); *B65H 2402/441* (2013.01); *B65H 2403/25* (2013.01)
(58) Field of Classification Search
CPC ........ B65G 23/02; B65G 23/04; B65G 23/10; B65G 23/44; B65H 7/06; B65H 2403/25; B65H 2402/441
USPC ................................. 198/813, 814
See application file for complete search history.

(56) References Cited

U.S. PATENT DOCUMENTS 7,650,731 B2 * 1/2010 Nowakowski ......... B65G 23/44
53/244

FOREIGN PATENT DOCUMENTS

| JP | H08110666 A |   | 4/1996 |
|----|-------------|---|--------|
| JP | 2001063866 A | * | 3/2001 |
| JP | 2021127223 A |   | 9/2021 |
| JP | 2022077906 A |   | 5/2022 |

OTHER PUBLICATIONS

Espacenet machine translation of JP2001063866A; https://translationportal.epo.org/emtp/translate/?ACTION=description-retrieval&COUNTRY=JP&ENGINE=google&FORMAT=docdb&KIND=A&LOCALE=en_EP&NUMBER=2001063866&OPS=ops.epo.org/3.2&SRCLANG=ja&TRGLANG=en (Year: 2001).*

* cited by examiner

*Primary Examiner* — Leslie A Nicholson, III
(74) *Attorney, Agent, or Firm* — Canon U.S.A., Inc., IP Division

(57) ABSTRACT

A sheet conveying apparatus includes a conveying unit, a drive source, a drive transmission unit, a tensioner, and a moving member. The drive source drives the conveying unit to convey a sheet. The drive transmission unit includes a drive transmission belt and a rotatable member to engage with the drive transmission belt. The drive transmission unit transmits a driving force of the drive source to the conveying unit via the drive transmission belt and the rotatable member. The tensioner moves between a pressing position at which the drive transmission belt is pressed and a retracted position retracted from the pressing position. The moving member moves the tensioner from the pressing position toward the retracted position. The magnitude of tension exerted on the drive transmission belt is lower when the tensioner is at the retracted position than when the tensioner is at the pressing position.

20 Claims, 10 Drawing Sheets

FIG. 7A
FIG. 7B
FIG. 7C
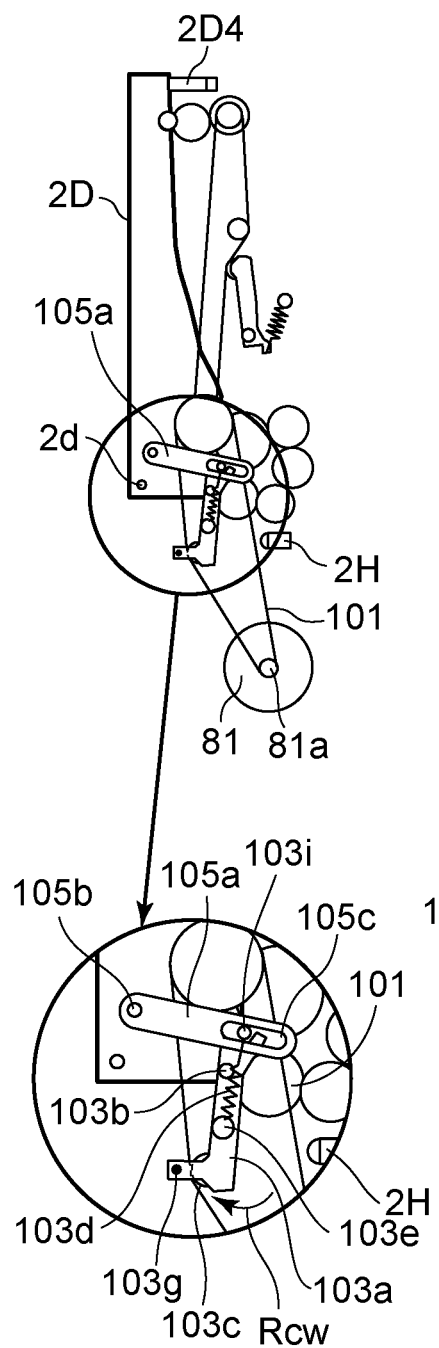
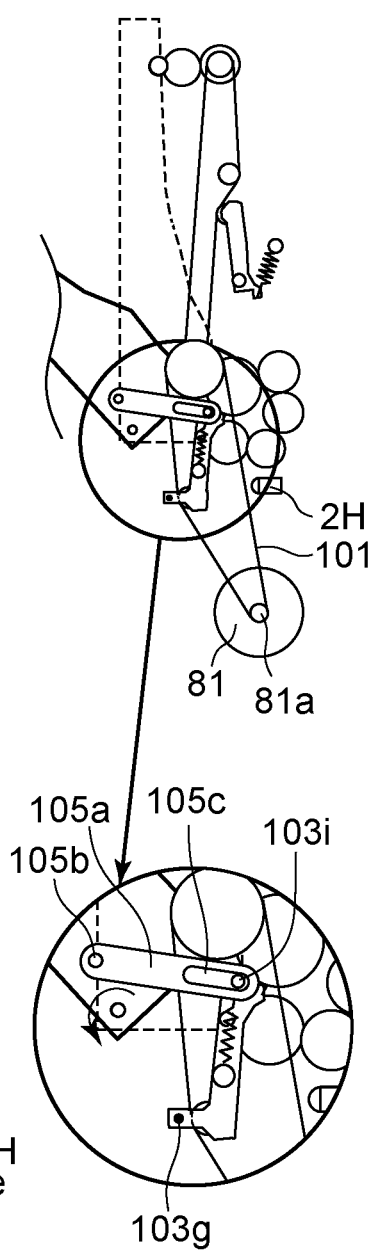
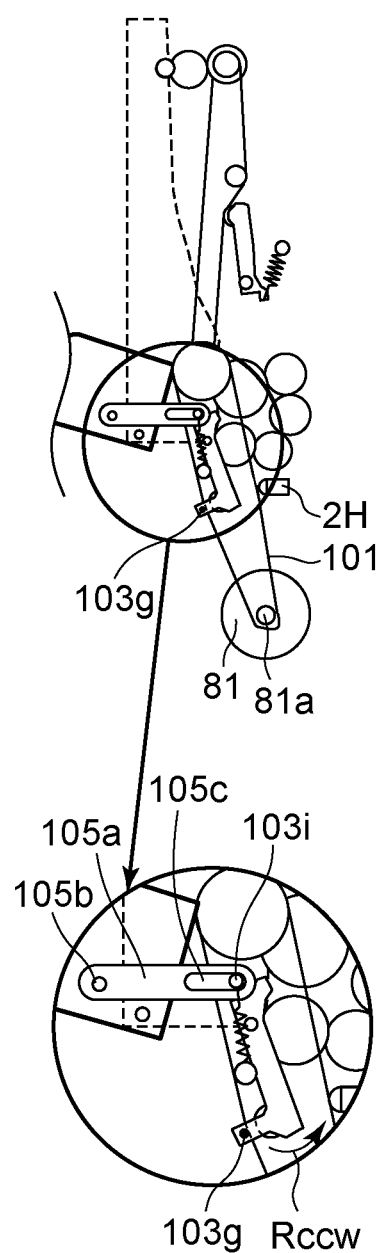

SHEET CONVEYING APPARATUS AND IMAGE FORMING APPARATUS

BACKGROUND

Field

The present disclosure relates to sheet conveying apparatuses and image forming apparatuses that form images on sheets.

Description of the Related Art

For sheet conveying apparatuses mounted in image forming apparatuses, a configuration in which the driving force of the motor is transmitted to a sheet conveying roller via a belt has been proposed (Japanese Patent Laid-Open No. 2021-127223). In the apparatus disclosed in Japanese Patent Laid-Open No. 2021-127223, the belt receives tension from a tension pulley.

The tension exerted on the belt that transmits the driving force to the sheet conveying unit is desirably reduced, for example, when the user clears a sheet jam.

SUMMARY

The present disclosure reduces tension exerted on a belt that transmits a driving force to a sheet conveying unit.

According to an aspect of the present disclosure, a sheet conveying apparatus includes a conveying unit configured to convey a sheet, a drive source configured to drive the conveying unit, a drive transmission unit including a drive transmission belt and a rotatable member configured to engage with the drive transmission belt, wherein the drive transmission unit is configured to transmit a driving force of the drive source to the conveying unit via the drive transmission belt and the rotatable member, a tensioner configured to move between a pressing position at which the drive transmission belt is pressed and a retracted position retracted from the pressing position, and a moving member configured to move the tensioner from the pressing position toward the retracted position, wherein a magnitude of tension exerted on the drive transmission belt is lower when the tensioner is at the retracted position than when the tensioner is at the pressing position.

Further features of the present disclosure will become apparent from the following description of exemplary embodiments with reference to the attached drawings.

BRIEF DESCRIPTION OF THE DRAWINGS

FIGS. 7A to 7C are diagrams illustrating a configuration for reducing the tension of the first belt according to a third embodiment.

DESCRIPTION OF THE EMBODIMENTS

Embodiments of the present disclosure will be described in detail hereinbelow with reference to the drawings by way of example. It is to be understood that the dimensions, materials, shapes, and relative positions of the components described in the following embodiments can be appropriately changed according to the configurations and various conditions of the apparatuses to which the present disclosure is applied. Accordingly, it is also to be understood that the scope of the present disclosure is not limited thereto unless otherwise specified.

First Embodiment

Overall Configuration of Image Forming Apparatus

Referring to FIG. 1 and FIGS. 2A to 2D, the overall configuration of an image forming apparatus 1 according to this embodiment will be described.

Figure 1:
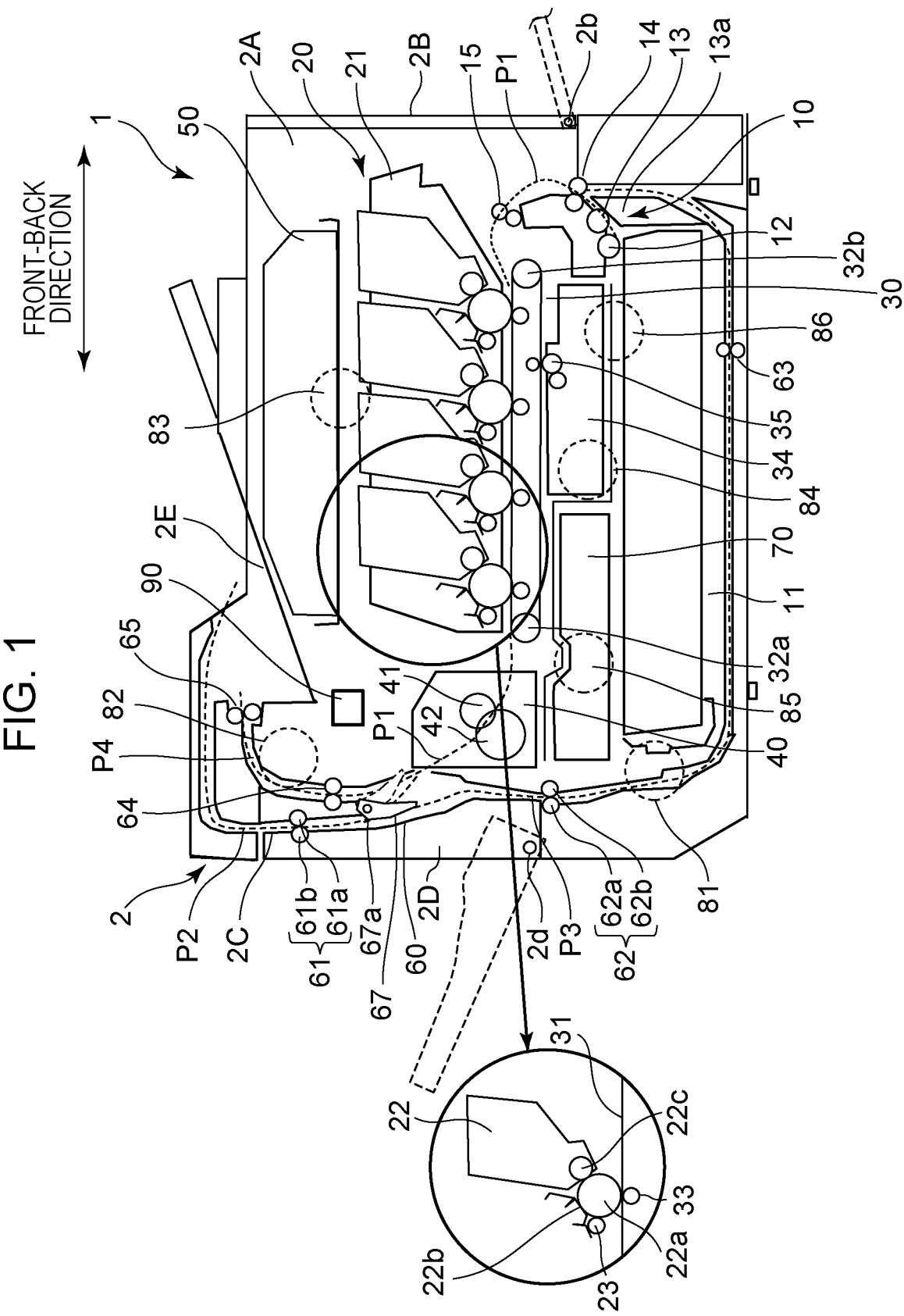
FIG. 1 is a cross-sectional view of an image forming apparatus illustrating, in outline, the configuration thereof.

FIG. 1 is a cross-sectional view of the image forming apparatus 1 according to this embodiment illustrating, in outline, the configuration thereof.

Figure 2A:
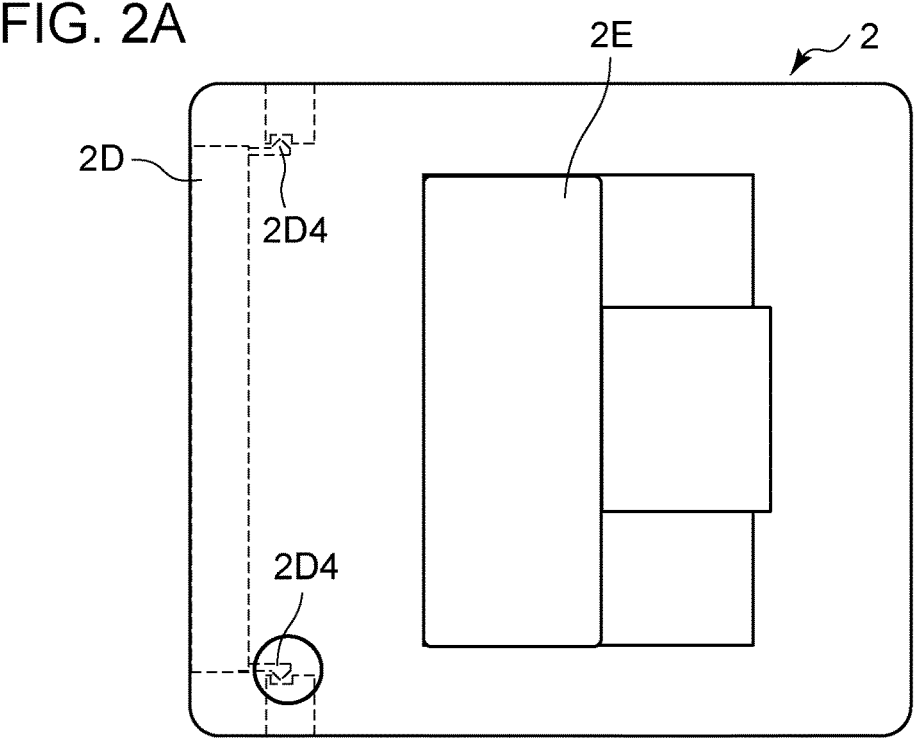
FIGS. 2A to 2D are diagrams illustrating a main body and a rear cover of the image forming apparatus.
Figure 2B:
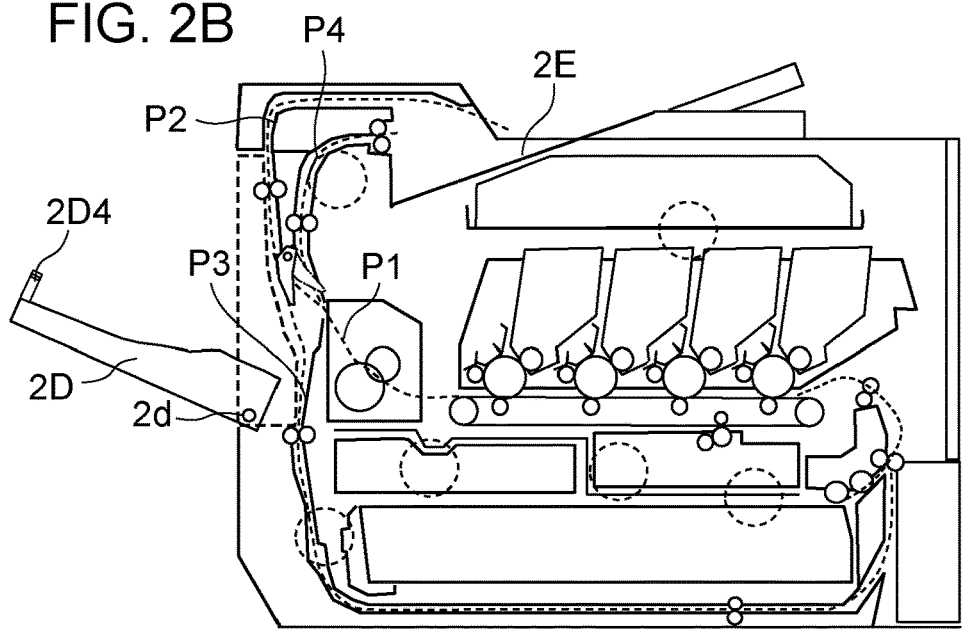
Figure 2C:
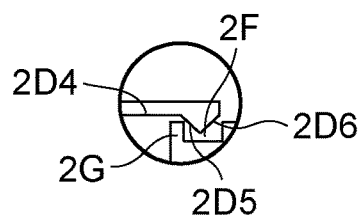
Figure 2D:
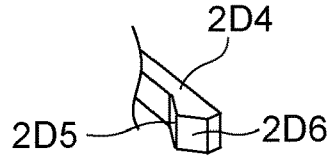

FIGS. 2A to 2D are diagrams illustrating a main body 2 and a rear cover 2D of the image forming apparatus 1. FIG. 2A is a top view of the image forming apparatus 1. FIG. 2B is a cross-sectional view of the image forming apparatus 1. FIGS. 2C and 2D are explanatory diagram of an engaging portion 2D4 of the rear cover 2D.

The image forming apparatus 1 according to this embodiment is a laser beam printer. As shown in FIG. 1, the image forming apparatus 1 includes the main body 2, a sheet feeding unit 10 that feeds sheets S, an image forming unit 20 that forms images on the sheets S, a transferring conveying unit 30, a fixing unit 40, a scanner (an exposure unit) 50, a sheet conveying unit 60, and a power supply unit 70.

The sheet feeding unit 10, the image forming unit 20, the transferring conveying unit 30, the fixing unit 40, the scanner 50, the sheet conveying unit 60, and the power supply unit 70 are housed in the main body 2.

The main body 2 includes an opening 2A and an opening 2C. The opening 2A is provided at the front of the main body 2, and the opening 2C is provided at the back of the main body 2.

The image forming apparatus 1 includes a front cover 2B configured to be openable and closable with respect to the main body 2. The front cover 2B is rotatable about a rotation axis 2b at the lower end and is connected to the main body 2. The front cover 2B can move between a closed position (the position indicated by the solid line in FIG. 1) at which the opening 2A is closed and an open position (the position indicated by the dotted line in FIG. 1) at which the opening 2A is opened by rotating about the rotation axis 2b. In other words, when the front cover 2B is at the closed position, the opening 2A is covered with the front cover 2B, and when the front cover 2B is at the open position, the opening 2A is exposed.

The image forming unit 20 can move between the interior and the outside of the main body 2 through the opening 2A. The image forming unit 20 includes four cartridges 22 and a tray (a drawer, a cartridge supporting unit) 21 to which the four cartridges 22 are detachably attached. The tray 21 is movable between the interior and the outside of the main body 2, with the four cartridges 22 movably attached.

Moving the front cover 2B to the open position to open the opening 2A enables the tray 21 and the four cartridges 22 to be drawn out of or attached to the main body 2 through the opening 2A.

The image forming apparatus 1 includes the rear cover 2D configured to be openable and closable with respect to the main body 2. The rear cover 2D is rotatable about a door supporting portion 2d at the lower end and is connected to the main body 2. The rear cover 2D can move between a closed position (the position indicated by the solid line in FIG. 1) at which the opening 2C is closed and an open position (the position indicated by the dotted line in FIG. 1) at which the opening 2C is opened by rotating about the door supporting portion 2d. In other words, when the rear cover 2D is at the closed position, the opening 2C is covered with the rear cover 2D, and when the rear cover 2D is at the open position, the opening 2C is exposed.

The main body (casing) 2 has conveying paths P1, P2, P3, and P4 through which the sheets S are conveyed. When the rear cover 2D is at the closed position, at least part of the conveying paths P1 to P4 is covered with the rear cover 2D. When the rear cover 2D is at the open position, at least part of the conveying paths P1 to P4 is exposed. When the sheet S has stopped (jammed) in the conveying path P1, P2, P3, or P4, the user can move the rear cover 2D to the open position to open the opening 2C and can pull out and remove the sheet S from the conveying path P1, P2, P3, or P4.

As shown in FIGS. 2A and 2B, the rear cover 2D includes two engaging portions 2D4 at the upper part. The two engaging portions 2D4 are individually disposed at one end and the other end in the direction of the rotation axis of the rear cover 2D.

As shown in FIG. 2C, when the rear cover 2D is at the closed position, the engaging portions 2D4 engage with cover supporting portions 2F of the main body 2, so that the rear cover 2D is held at the closed position. As shown in FIG. 2D, each engaging portion 2D4 includes a first inclined surface 2D5 and a second inclined surface 2D6 that comes into contact with a cover supporting end 2G, provided at the main body 2, when the rear cover 2D is opened or closed. When the rear cover 2D is opened or closed, the first inclined surface 2D5 or the second inclined surface 2D6 comes into contact with the cover supporting end 2G of the main body 2, and the engaging portion 2D4 is plastically deformed.

As shown in FIG. 1, the image forming unit 20 includes four photosensitive drum 22a disposed side by side in the front-back direction. The photosensitive drum 22a faces a developing roller 22c, a charging unit 22b, and a cleaning roller 23. The image forming unit 20 includes the four cartridges 22, as described above. The four cartridges 22 individually contain black, yellow, magenta, and cyan toners.

In this embodiment, the photosensitive drum 22a and the charging unit 22b are mounted on the tray 21, and the developing roller 22c is mounted at the cartridge 22 that is detachably mounted on the tray 21. However, the present disclosure may have another configuration. For example, the photosensitive drum 22a, the charging unit 22b, and the developing roller 22c may be disposed in the cartridge 22. The photosensitive drum 22a and the developing roller 22c may be disposed in different cartridges. The photosensitive drum 22a, the charging unit 22b, and the developing roller 22c may be disposed on the tray 21, and a toner container may be provided in the cartridge 22.

As shown in FIG. 1, the transferring conveying unit 30 is disposed below the image forming unit 20. The transferring conveying unit 30 includes a transfer conveying belt 31, a driving roller 32a, a driven roller 32b, and four transfer rollers 33. The driving roller 32a, the driven roller 32b, and the four transfer rollers 33 are disposed inside the loop transfer conveying belt 31. The transfer conveying belt 31 is driven by the driving roller 32a. The transfer conveying belt 31 is nipped between the photosensitive drums 22a and the transfer rollers 33.

A belt cleaner unit 34 that collects toner from the transfer conveying belt 31 is disposed below the transferring conveying unit 30 and above the sheet feeding unit 10. The belt cleaner unit 34 includes a belt cleaning roller 35, which is in contact with the transfer conveying belt 31 to collect toner from the transfer conveying belt 31.

The image forming apparatus 1 includes six motors, first to six driving motors 81 to 86. The power supply unit 70 supplies electric power to the motors 81 to 86. The first driving motor (the drive source) 81 drives a reversing roller pair 61 and an intermediate refeeding roller pair 62, which function as a conveying unit for conveying the sheets S. The second driving motor 82 drives a discharge roller pair 65 and an intermediate discharge roller pair 64. The third driving motor 83 drives the developing rollers 22c. The fourth driving motor 84 drives the photosensitive drums 22a. The fifth driving motor 85 drives the fixing unit 40. The sixth driving motor 86 drives a feeding roller 12, a separating roller 13, a conveying roller pair 14, a registration roller pair 15, and a refeeding roller pair 63.

The image forming apparatus 1 has the function of a sheet conveying apparatus that conveys the sheets S.

Image Forming Operation

Next, an image forming operation for forming images on the sheet S will be described. The image forming apparatus 1 is capable of one-side printing for forming images on one side of the sheet S and two-side printing for forming images on both sides of the sheet S.

First, a control unit 90 of the image forming apparatus 1 controls the motors 81 to 86, the scanner 50, and the power supply unit 70 in response to an image signal from a host computer (not shown) to execute an image forming operation. The control unit 90 includes a central processing unit (CPU), a read-only memory (ROM), and a random-access memory (RAM).

When the image forming operation is started, the photosensitive drums 22a are rotated and charged by the charging units 22b. A laser beam from the scanner 50 is applied to each photosensitive drum 22a in response to an image signal. This causes an electrostatic latent image to be formed on the photosensitive drum 22a. The photosensitive drum 22a functions as an image bearing member that bears the electrostatic latent image.

The developing roller 22c bears toner, which is a developer. The electrostatic latent image on the photosensitive drum 22a is developed by the toner on the developing roller 22c to form a toner image on the photosensitive drum 22a.

The sheet feeding unit 10 includes a sheet container 11 that contains the sheets S. The feeding roller 12 starts to rotate at a predetermined timing to feed the sheet S contained in the sheet container 11. When a plurality of sheets S is sent at the same time, only the uppermost sheet S is separated and conveyed by the action of the separating roller 13 and a separating pad 13a.

The sheet S is conveyed in the conveying path P1 by the conveying roller pair 14 to the registration roller pair 15, where the skew of the sheet S is corrected.

The sheet S is conveyed to a transfer unit formed of the photosensitive drum 22a and the transferring conveying unit 30 by the registration roller pair 15 and the transfer conveying belt 31. In the transfer unit, the toner image formed on the photosensitive drum 22a is electrically attracted by the transfer roller 33 and is transferred to the sheet S.

The sheet S on which the toner image is transferred is conveyed to the fixing unit 40 including a heating unit 41 and a pressing unit 42. Heating and pressing the sheet S with the fixing unit 40 causes the toner image to be fixed to the sheet S.

The sheet conveying unit 60 includes a flapper 67. The flapper 67 rotates about a flapper rotation center 67a. In one-side printing of the sheet S, the flapper 67 is at the position indicated by the solid line in FIG. 1, so that the sheet S is guided to the conveying path P4. The guided sheet S passes through the conveying path P4 and is discharged onto a discharge tray (a stack unit) 2E on the top of the main body 2 by the intermediate discharge roller pair 64 and the discharge roller pair 65.

In two-side printing of the sheet S, the sheet S with a toner image fixed one side (front surface) is conveyed again toward the transfer unit through the conveying path P2 and the conveying path P3. More specifically, in two-side printing of the sheet S, the flapper 67 is at the position indicated by the dotted line in FIG. 1, so that the sheet S with the toner image fixed to one side is guided to the conveying path P2.

The guided sheet S is conveyed in the conveying path P2 by the reversing roller pair 61. The leading end of the conveyed sheet S may protrude out of the main body 2.

After the trailing end of the sheet S exits the fixing unit 40, the direction of rotation of the first driving motor 81 is switched to reverse the reversing roller pair 61, so that the sheet S is returned. The returned sheet S is guided to the conveying path P3 and is conveyed to the conveying roller pair 14 by the intermediate refeeding roller pair 62 and the refeeding roller pair 63.

Thereafter, a toner image is formed on the back of the sheet S as in one-side printing.

The sheet S with the toner image fixed to the back by the fixing unit 40 is guided to the conveying path P4 by the flapper 67 at the position indicated by the solid line in FIG. 1. The guided sheet S passes through the conveying path P4 and is discharged onto the discharge tray 2E on the top of the main body 2 by the intermediate discharge roller pair 64 and the discharge roller pair 65.

In other words, the reversing roller pair 61, the intermediate refeeding roller pair 62, and the refeeding roller pair 63 are disposed on the conveying paths P2 and P3 through which the sheet S that has passed through the transfer unit passes when returning to the transfer unit.

Drive Transmission Unit

The driving force of the first driving motor (drive source) 81 of this embodiment is transmitted to the reversing roller pair (a first conveying unit) 61 and the intermediate refeeding roller pair (a second conveying unit) 62, serving as a conveying unit for conveying the sheet S, via the drive transmission unit including the belt and the rotatable members. The reversing roller pair 61 and the intermediate refeeding roller pair 62 are disposed away from each other in the conveying direction of the sheet S.

Figure 3A:
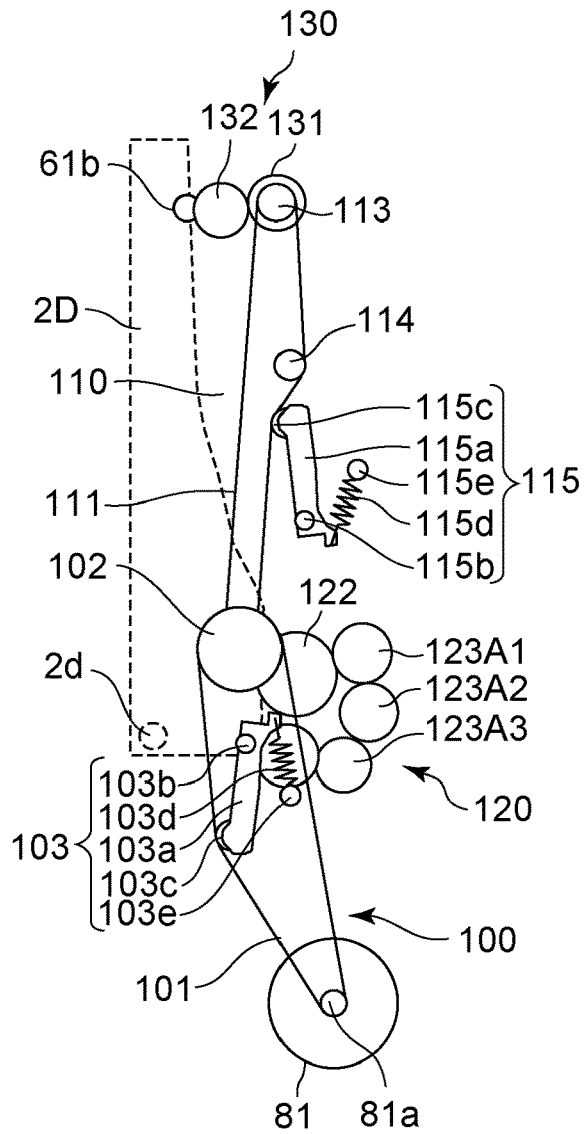
FIGS. 3A to 3D are diagrams illustrating transmission of a driving force from a first driving motor.
Figure 3B:
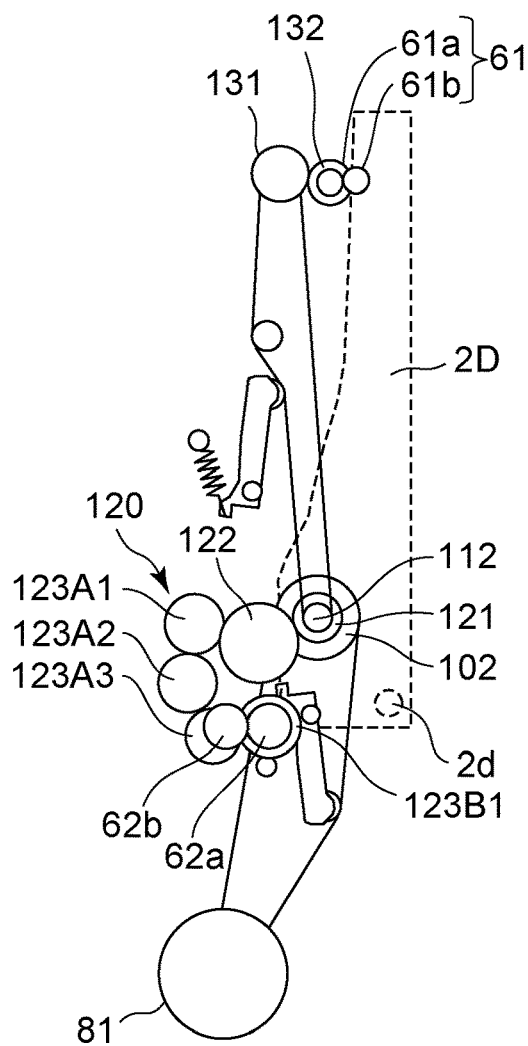
Figure 3C:
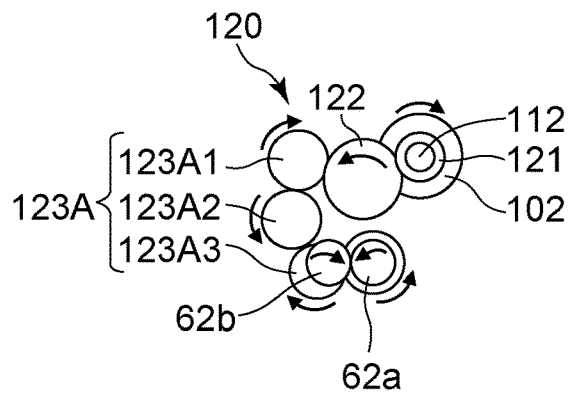
Figure 3D:
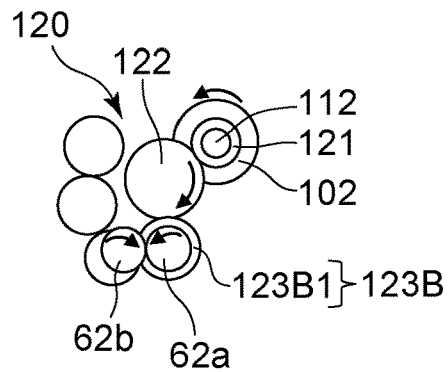

Referring to FIGS. 3A to 3D, the driving of the reversing roller pair 61 and the intermediate refeeding roller pair 62 using the first driving motor 81 will be described. FIGS. 3A to 3D are diagrams illustrating transmission of a driving force from the first driving motor 81. FIG. 3A is a diagram of a first belt driving section 100 and a second belt driving section 110 seen from one side in the direction of the rotation axis of the intermediate refeeding roller 62a of the intermediate refeeding roller pair 62. FIG. 3B is a diagram of the first belt driving section 100 and the second belt driving section 110 seen from the other side in the direction of the rotation axis of the intermediate refeeding roller 62a. FIGS. 3C and 3D are detailed views of a drive train 120 for driving the intermediate refeeding roller pair 62, illustrating part of FIG. 3B.

The image forming apparatus 1 includes a drive transmission unit configured to transmit the driving force of the first driving motor 81 to the reversing roller pair 61 and the intermediate refeeding roller pair 62. In this embodiment, the drive transmission unit includes the first belt driving section 100 and the second belt driving section 110. The first belt driving section 100 is configured to transmit the driving force of the first driving motor 81 to the intermediate refeeding roller 62a of the intermediate refeeding roller pair 62. The second belt driving section 110 is configured to transmit the driving force of the first driving motor 81, transmitted via the first belt driving section 100, to a reversing roller 61a of the reversing roller pair 61.

As shown in FIGS. 3A and 3B, the first belt driving section 100 includes a pinion gear 81a connected to the first driving motor 81, a first pulley 102, and a first belt (a first drive transmission belt) 101. A first tensioner 103 is disposed inside the loop formed by the first belt 101. The first belt 101 is stretched between the pinion gear 81a and the first pulley 102 and receives an urging force from the first tensioner 103. In this embodiment, the first tensioner 103 is provided at the main body 2.

The first tensioner 103 includes a first supporting member (a first arm) 103a, a first roller (a first pressing unit) 103c rotationally supported by the first supporting member 103a, and a first urging member 103d that urges the first supporting member 103a.

The first supporting member 103a is rotatable about a first rotation center 103b. One end of the first urging member 103d is attached to a first attaching portion (first urging supporting portion) 103e, and the other end of the first urging member 103d is attached to the first supporting member 103a. In this embodiment, the first urging member 103d is a tension spring, but may be a compression spring, a torsion coil spring, a leaf spring, or the like.

The first tensioner 103 is urged by the first urging member 103d toward a first pressing position (pressing position) at which the first belt 110 is pressed. When the first tensioner 103 is at the first pressing position, the first roller 103c presses the first belt 101 from the interior of the first belt 101 to exert tension to the first belt 101. With the first tensioner 103 at the first pressing position, and the first belt 101 under the tension, the first belt 101 engages with the pinion gear 81a and the first pulley 102. The first tensioner 103 is movable with respect to the first belt 101 between the pressing position and a retracted position retracted from the pressing position, as described later.

The pinion gear 81a and the first pulley 102 function as rotatable members that engage with the first belt 101. The first belt driving section 100 functions as a drive transmission unit configured to transmit the driving force of the first driving motor 81 to the intermediate refeeding roller pair 62 via the pinion gear 81*a*, the first pulley 102, and the first belt 101. The reversing roller pair 61 is driven by the driving force transmitted by the first belt driving section 100, as described later. Thus, the first belt driving section 100 functions as a drive transmission unit configured to transmit the driving force of the first driving motor 81 to the reversing roller pair 61 via the pinion gear 81*a*, the first pulley 102, and the first belt 101.

When the pinion gear 81*a* is driven by the first driving motor 81, the pinion gear 81*a* drives the first belt 101 pressed by the first tensioner 103. The driving force of the first driving motor 81 is transmitted to the first pulley 102 via the first belt 101. The driving force transmitted to the first pulley 102 is transmitted to the drive train 120.

As shown in FIGS. 3B, 3C, and 3D, the first pulley 102 includes a first input gear 121 and a second pulley 112. The first pulley 102, the first input gear 121, and the second pulley 112 rotate together. The first pulley 102, the first input gear 121, and the second pulley 112 are coaxially disposed and rotate at the same rotational speed.

The drive train 120 includes the first input gear 121, a pendulum gear 122, a first drive unit 123A, and a second drive unit 123B. The first drive unit 123A is a gear train including a first transmission gear 123A1, a second transmission gear 123A2, and a third transmission gear 123A3. The second drive unit 123B includes a first roller gear 123B1 connected to the intermediate refeeding roller 62*a*.

The third transmission gear 123A3 engages with the first roller gear 123B1.

The pendulum gear 122 engages with the first input gear 121. As shown in FIGS. 3C and 3D, the position of the pendulum gear 122 changes according to the direction of rotation of the first input gear 121.

As shown in FIG. 3C, when the first input gear 121 rotates clockwise, the pendulum gear 122 moves to the position of engagement with the first transmission gear 123A1 of the first drive unit 123A, so that the driving force is transmitted to the intermediate refeeding roller 62*a* via the first drive unit 123A. In this case, the intermediate refeeding roller 62*a* rotates counterclockwise.

As shown in FIG. 3D, when the first input gear 121 rotates counterclockwise, the pendulum gear 122 moves to the position of engagement with the first roller gear 123B1 of the second drive unit 123B, so that the driving force is transmitted to the intermediate refeeding roller 62*a* via the second drive unit 123B. In this case, the intermediate refeeding roller 62*a* rotates counterclockwise.

Thus, the intermediate refeeding roller 62*a* rotates constantly in one direction (counterclockwise in FIGS. 3C and 3D) regardless of the direction of rotation of the first input gear 121. An intermediate refeeding driven roller 62*b* is in contact with the intermediate refeeding roller 62*a* and is rotated by the intermediate refeeding roller 62*a*.

As shown in FIGS. 3A and 3B, the second belt driving section 110 includes a second belt (a second drive transmission belt) 111, a second pulley 112, a third pulley 113, and an idler pulley 114. A second tensioner 115 is disposed outside the second belt 111. The second belt 111 is stretched round the second pulley 112, the third pulley 113, and the idler pulley 114 and receives an urging force from the second tensioner 115. In this embodiment, the second tensioner 115 is provided at the main body 2.

The second tensioner 115 includes a second supporting member (a second arm) 115*a*, a second roller (a second pressing unit) 115*c*, which is rotatably supported by the second supporting member 115*a*, and a second urging member 115*d* that urges the second supporting member 115*a*.

The second supporting member 115*a* is rotatable about a second rotation center 115*b*. One end of the second urging member 115*d* is attached to a second attaching portion (a second urging supporting portion) 115*e*, and the other end of the second urging member 115*d* is attached to the second supporting member 115*a*. In this embodiment, the second urging member 115*d* is a tension spring, but may be a compression spring, a torsion coil spring, a leaf spring, or the like.

The second tensioner 115 is urged by the second urging member 115*d* toward a second pressing position (pressing position) at which the second belt 111 is pressed. When the second tensioner 115 is at the second pressing position, the second roller 115*c* presses the second belt 111 from the outside of the second belt 111 to exert tension to the second belt 111. With the second tensioner 115 at the second pressing position, and the second belt 111 under the tension, the second belt 111 engages with the second pulley 112 and the third pulley 113.

The second pulley 112 and the third pulley 113 function as rotatable members that engage with the second belt 111. The second belt driving section 110 functions as a drive transmission unit configured to transmit the driving force of the first driving motor 81 to the reversing roller pair 61 via the second pulley 112, the third pulley 113, and the second belt 111.

As shown in FIG. 3A, the third pulley 113 includes a second input gear 131. The third pulley 113 and the second input gear 131 rotate together. The third pulley 113 and the second input gear 131 are coaxially disposed and rotate at the same rotational speed.

When the first driving motor 81 is driven, its driving force is transmitted to the second pulley 112 via the first belt driving section 100, and the second pulley 112 drives the second belt 111 pressed by the second tensioner 115. The driving force of the first driving motor 81 is transmitted to the third pulley 113 via the second belt 111. The driving force transmitted to the third pulley 113 is transmitted to a reversing drive train 130.

The reversing drive train 130 includes a second input gear 131 and a second roller gear 132 connected to the reversing roller 61*a*. The second input gear 131 engages with the second roller gear 132. When the direction of rotation of the first driving motor 81 switches, the direction of rotation of the reversing roller 61*a* also switches. A reversing roller 61*b* is in contact with the reversing roller 61*a* and is rotated by the reversing roller 61*a*.

Configuration for Reducing Tension of First Belt

Figure 4A:
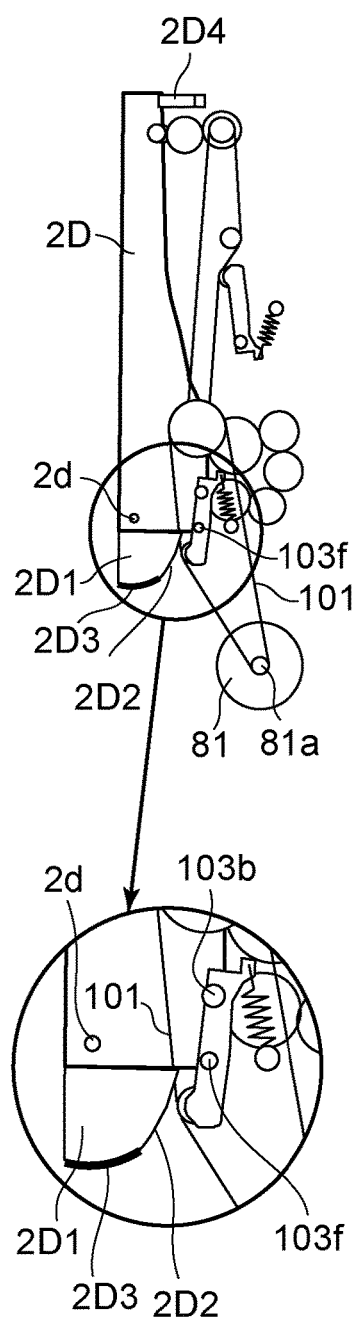
FIGS. 4A to 4C are diagrams illustrating a configuration for reducing the tension of a first belt according to a first embodiment.
Figure 4B:
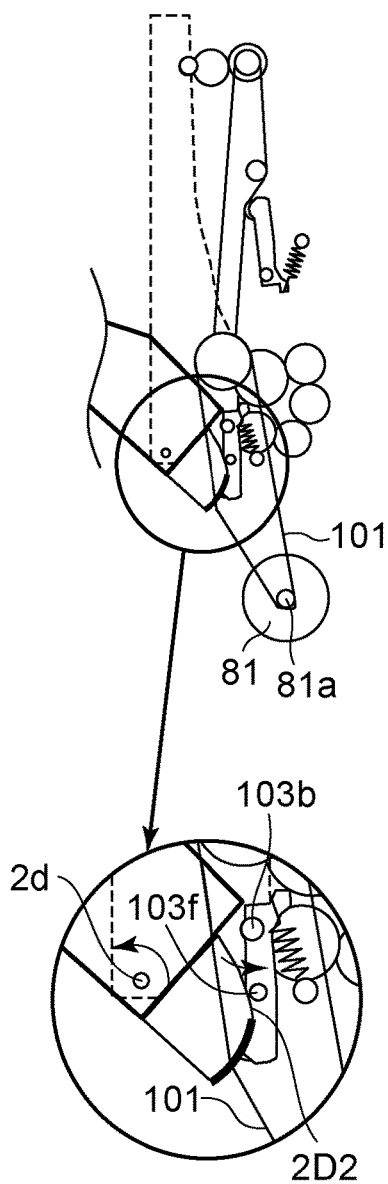
Figure 4C:
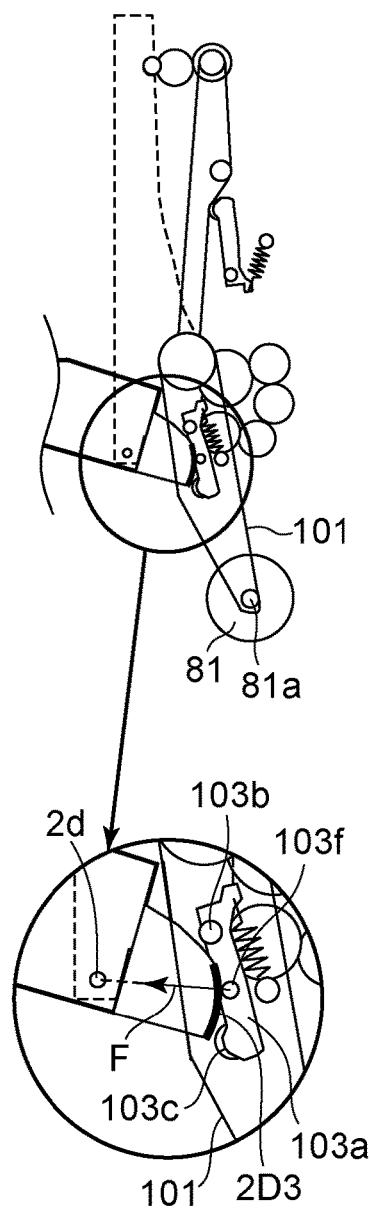

Referring to FIGS. 4A to 4C, a configuration for reducing the tension of the first belt 101 of the first belt driving section 100 will be described. FIGS. 4A, 4B, and 4C are diagrams illustrating the configuration for reducing the tension of the first belt 101 of the first belt driving section 100 according to this embodiment. FIG. 4A illustrates a state in which the rear cover 2D is at the closed position. FIG. 4B illustrates a state in which the rear cover 2D is at a position between the closed position to the open position. FIG. 4C illustrates a state in which the rear cover 2D is at the open position.

When the sheet S is jammed, the sheet S can be removed by the user drawing the sheet S. For example, when the sheet S is drawn, with the sheet S is nipped in the reversing roller pair 61, an external force acts on the reversing roller pair 61 from the sheet S to rotate the reversing roller pair 61. The same applies to a case in which the sheet S is drawn, with the sheet S nipped in the intermediate refeeding roller pair 62.

With the first belt 101 and the second belt 111 under tension, the reversing roller pair 61 and the intermediate refeeding roller pair 62 are connected to the first driving motor 81 via the first belt 101 and the second belt 111, respectively. In this state, when the reversing roller pair 61 or the intermediate refeeding roller pair 62 is rotated, the first driving motor 81 is also rotated, which requires a large force. As a result, the user needs to draw the sheet S with a large force to remove the sheet S.

Reduction in the tension of the first belt 101 may reduce the force for rotating the reversing roller pair 61 or the intermediate refeeding roller pair 62.

The image forming apparatus 1 of this embodiment includes, as a moving member for moving the first tensioner 103 from the pressing position toward the retracted position, a cam 2D1 serving as a pressing unit of the rear cover 2D.

When the sheet S is jammed, the user needs to move the rear cover 2D from the closed position to the open position to expose the conveying units P1 to P4 to remove the sheet S. The cam 2D1 moves the first tensioner 103 from the pressing position toward the retracted position in conjunction with the movement of the rear cover 2D from the closed position to the open position.

The cam 2D1 includes a cam surface 2D2 and a cam surface 2D3. The first tensioner 103 includes a first receiving portion 103f, which comes into contact with the cam 2D1.

As shown in FIG. 4A, when the rear cover 2D is at the closed position, the cam 2D1 is spaced away from the first receiving portion 103f of the first tensioner 103, and the first tensioner 103 is at the pressing position to urge the first belt 101.

As shown in FIG. 4B, when the rear cover 2D moves from the closed position toward the open position, the cam surface 2D2 comes into contact with the first receiving portion 103f, and the first tensioner 103 rotates about the first rotation center 103b counterclockwise in the drawing. The rotation of the first tensioner 103 reduces the urging force from the first tensioner 103 to the first belt 101, thereby decreasing the tension of the first belt 101.

As shown in FIG. 4C, when the rear cover 2D is at the open position, the cam surface 2D3 is in contact with the first receiving portion 103f, and the first tensioner 103 is located at the retracted position. At that time, the first roller 103c of the first tensioner 103 is separated from the first belt 101.

The cam surface 2D3 has an arc shape centered on the rotation axis of the rear cover 2D. An urging force F from the first tensioner 103 is exerted in the direction to the door supporting portion 2d, as shown in FIG. 4C. This prevents the rear cover 2D under the urging force of the first tensioner 103 from moving from the open position to the closed position. When the rear cover 2D is at a position between the open position and the closed position, and the cam 2D1 receives the urging force of the first urging member 103d, the rear cover 2D may be urged toward the closed position.

Thus, when the rear cover 2D moves from the closed position to the open position, the cam 2D1 presses the first tensioner 103 so that the first tensioner 103 moves from the pressing position toward the retracted position.

The magnitude of tension exerted on the first belt 101 is lower when the first tensioner 103 is at the retracted position than when the first tensioner 103 is at the pressing position.

The magnitude of the tension exerted on the first belt 101 when the first tensioner 103 is at the pressing position is referred to as "first intensity", and the magnitude of the tension exerted on the first belt 101 when the first tensioner 103 is at the retracted position is referred to as "second intensity". The second intensity may be zero or more than zero.

When the first tensioner 103 moves from the pressing position to the retracted position, at least one of the area of contact between the first belt 101 and the pinion gear 81a and the area of contact between the first belt 101 and the first pulley 102 decreases. The first belt 101 and the pinion gear 81a may be separated from each other, or the first belt 101 and the first pulley 102 may be separated from each other.

When the sheet S, nipped in the reversing roller pair 61 or in the intermediate refeeding roller pair 62, is drawn, an external force is exerted on the reversing roller pair 61 or the intermediate refeeding roller pair 62, as described above. When the first belt 101 receives an external force, with the first tensioner 103 at the retracted position, the engagement between the first belt 101 and the pinion gear 81a is cancelled, and the first belt 101 moves (rotates) ahead of the pinion gear 81a. In a configuration in which the transmission of driving between the first belt 101 and the pinion gear 81a is enabled by the engagement therebetween, the first belt 101 rotates while so-called tooth jumping occurs, or with the first belt 101 spaced away from the pinion gear 81a. In a configuration in which the transmission of driving between the first belt 101 and the pinion gear 81a is enabled by the friction therebetween, the first belt 101 rotates, with the first belt 101 sliding with respect to the pinion gear 81a or spaced away from the pinion gear 81a.

The speed ratio obtained by dividing the speed of the pinion gear 81a by the speed of the first belt 101 is compared between when the sheet S is conveyed and when the first tensioner 103 is at the retracted position, and the reversing roller pair 61 or the intermediate refeeding roller pair 62 undergoes an external force. The sheet S is conveyed when the first tensioner 103 is at the pressing position, and the pinion gear 81a is rotated by the first motor 81. The speed ratio is lower when the first tensioner 103 is at the retracted position, and the reversing roller pair 61 or the intermediate refeeding roller pair 62 undergoes an external force than the speed ratio when the sheet S is conveyed.

When the reversing roller pair 61 or the intermediate refeeding roller pair 62 undergoes an external force, the first pulley 102 may undergo the external force to cancel the engagement between the first pulley 102 and the first belt 101, and the first pulley 102 may be (moved) rotated ahead of the first belt 101. In a configuration in which the transmission of driving between the first belt 101 and the first pulley 102 is enabled by the engagement therebetween, the first pulley 102 rotates while so-called tooth jumping occurs, or with the first pulley 102 spaced away from the first belt 101. In a configuration in which the transmission of driving between the first belt 101 and the first pulley 102 is enabled by the friction therebetween, the first pulley 102 rotates while sliding with respect to the first belt 101 or spaced away from the first belt 101.

The speed ratio obtained by dividing the speed of the first belt 101 by the speed of the first pulley 102 is compared between when the sheet S is conveyed and when the first tensioner 103 is at the retracted position, and the reversing roller pair 61 or the intermediate refeeding roller pair 62 undergoes an external force. The sheet S is conveyed when the first tensioner 103 is at the pressing position, and the first belt 101 is rotated by the first motor 81. The speed ratio is lower when the first tensioner 103 is at the retracted position, and the reversing roller pair 61 or the intermediate refeeding roller pair 62 undergoes an external force than the speed ratio when the sheet S is conveyed.

In other words, this configuration prevents transmission of an external force to the first driving motor 81a, the external force acting on the reversing roller pair 61 or the intermediate refeeding roller pair 62 generated when the sheet S, which is jammed in the reversing roller pair 61 or in the intermediate refeeding roller pair 62, is drawn.

Advantageous Effects of this Embodiment

As described above, the first tensioner 103 moves to the retracted position to come away from the first belt 101 by moving the rear cover 2D from the closed position to the open position. This releases the tension acting on the first belt 101. As a result, the transmission path for transmitting the driving force from the first driving motor 81 to the first pulley 102 is blocked.

This eliminates the need for rotating the first motor 81 in drawing the sheet S jammed in the reversing roller pair 61 or the intermediate refeeding roller pair 62. This reduces the operating force of the user for removing the jammed sheet S, thereby preventing the sheet S from being damaged or the like by an excessive force.

Second Embodiment

A second embodiment will be described. A description of a configuration of an image forming apparatus 1 according to the second embodiment similar to the configuration of the first embodiment will be omitted.

Configuration for Reducing Tension of First Belt

Referring to FIGS. 5A to 5C and FIGS. 6A to 6G, a configuration for reducing the tension of the first belt 101 of the second embodiment will be described.

The image forming apparatus 1 according to this embodiment uses, as a moving member for moving the first tensioner 103 from the pressing position toward the retracted position, a drive train 104 connected to the rear cover 2D and the first tensioner 103. This drive train 104 includes a switching gear 104a and gears 104b and 104c. The force generated by the movement of the rear cover 2D is transmitted to the first tensioner 103 via the switching gear 104a and the gears 104b and 104c.

Figure 5A:
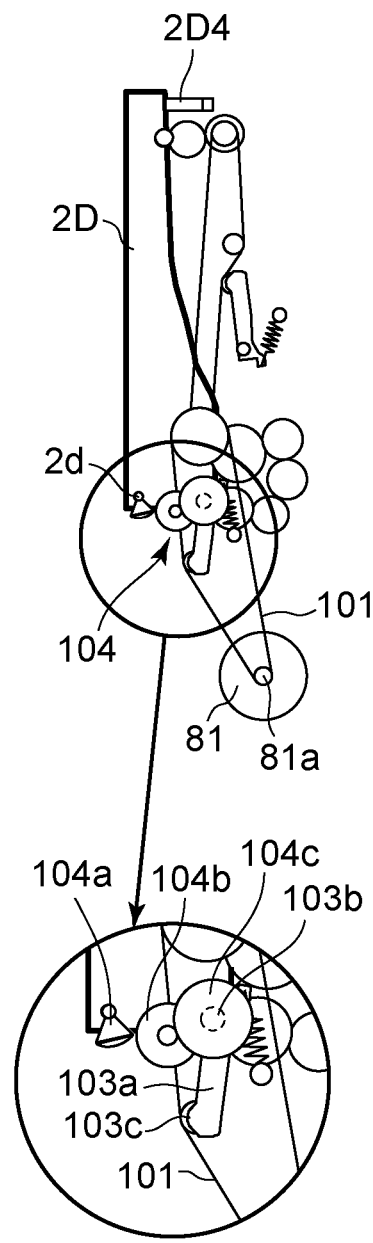
FIGS. 5A to 5C are diagrams illustrating a configuration for reducing the tension of the first belt according to a second embodiment.
Figure 5B:
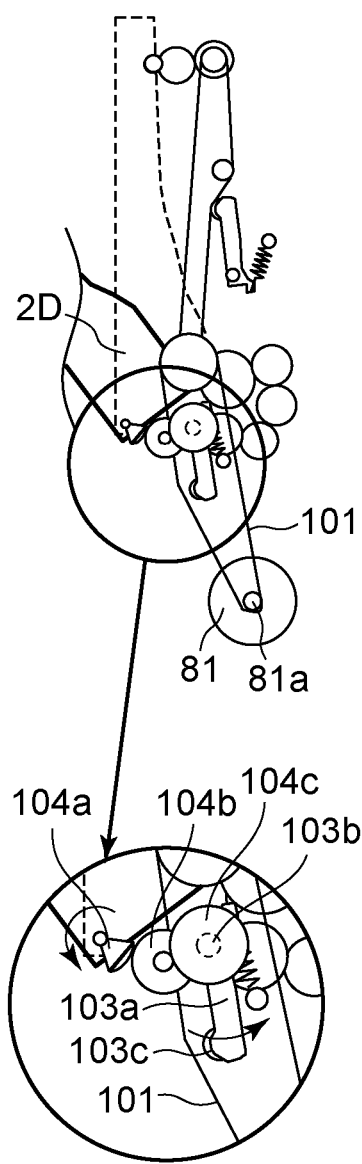
Figure 5C:
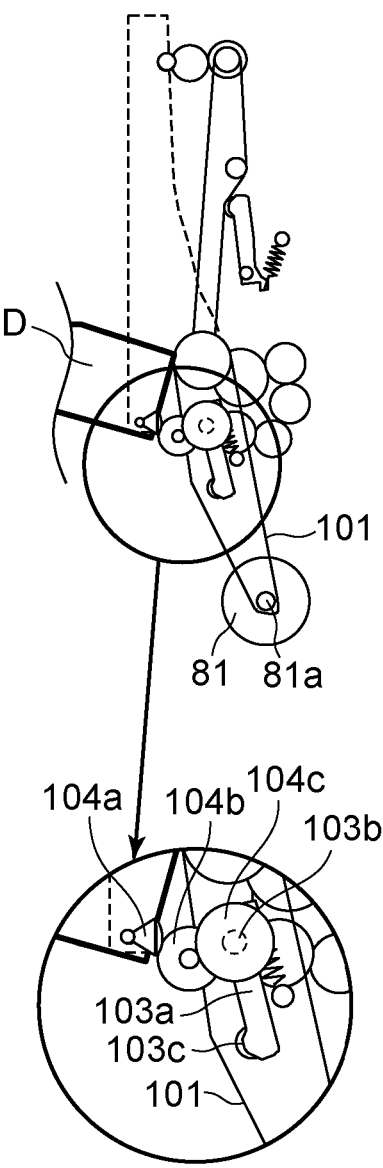

FIGS. 5A, 5B, and 5C are diagrams illustrating the configuration for reducing the tension of the first belt 101 of the first belt driving section 100 according to this embodiment. FIG. 5A illustrates a state in which the rear cover 2D is at the closed position. FIG. 5B illustrates a state in which the rear cover 2D is at a position between the closed position and the open position. FIG. 5C illustrates a state in which the rear cover 2D is at the open position.

Figure 6A:
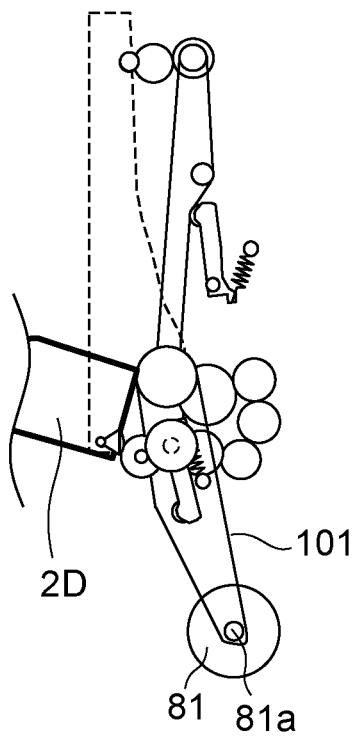
FIGS. 6A to 6G are diagrams illustrating the movement of the rear cover to the closed position according to the second embodiment.
Figure 6B:
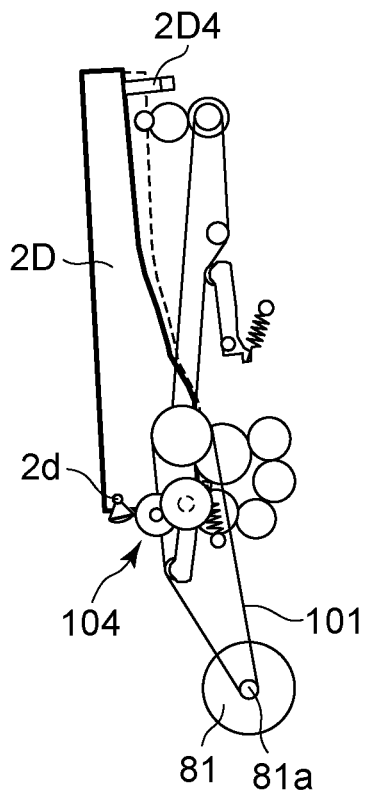
Figure 6C:
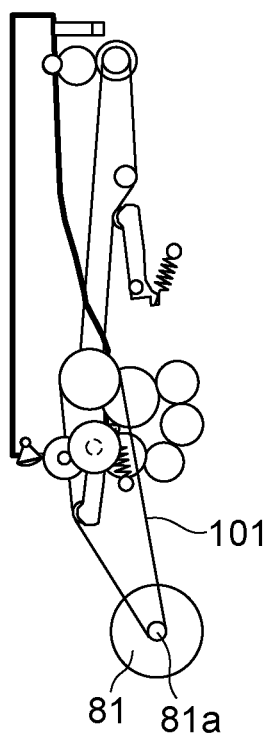
Figure 6D:
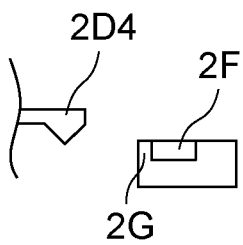
Figure 6E:
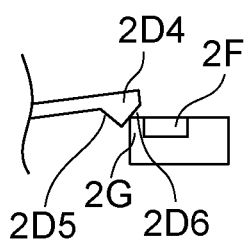
Figure 6F:
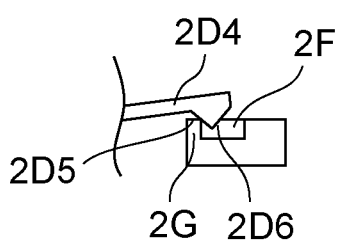
Figure 6G:
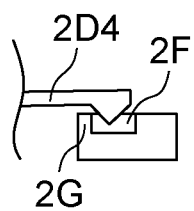

FIGS. 6A, 6B, 6C, 6D, 6E, 6F, and 6G are diagrams illustrating the movement of the rear cover 2D to the closed position according to this embodiment, which illustrate the configuration for reducing the tension of the first belt 101 of the first belt driving section 100. FIG. 6A illustrates a state in which the rear cover 2D is at the open position. FIG. 6B illustrates a state in which the rear cover 2D is at a position between the closed position to the open position. FIG. 6C illustrates a state in which the rear cover 2D is at the closed position. FIGS. 6D to 6G are detailed views of the engaging portion 2D4 of the rear cover 2D. FIG. 6D illustrates the engaging portion 2D4 when the rear cover 2D is at the open position. FIGS. 6E and 6F illustrate the engaging portion 2D4 when the rear cover 2D moves from the open position to the closed position. FIG. 6G illustrates the engaging portion 2D4 when the rear cover 2D is at the closed position.

The rear cover 2D of the second embodiment includes the switching gear 104a. The switching gear 104a is attached to the door supporting portion 2d and moves together with the rear cover 2D. More specifically, the switching gear 104a includes a gear unit disposed in an arc shape centered on the door supporting portion 2d.

The main body 2 includes the gear 104c attached to the first tensioner 103 and the gear 104b that engages with the gear 104c. The gear 104c is disposed coaxially with the first rotation center 103b of the first tensioner 103 and moves together with the first tensioner 103.

As shown in FIG. 5A, when the rear cover 2D is at the closed position, the switching gear 104a is at a position at which the switching gear 104a is out of engagement with the gear 104b. In this state, the first tensioner 103 urges the first belt 101 at the pressing position by the urging force of the first urging member 103d.

As shown in FIG. 5B, when the rear cover 2D moves from the closed position to the open position, the switching gear 104a engages with the gear 104b, so that the force (driving force) generated by the movement of the rear cover 2D is transmitted to the gear 104c via the gear 104b. Since the driving force is transmitted, the first roller 103c of the first tensioner 103 is separated from the first belt 101.

As shown in FIG. 5C, when the rear cover 2D is at the open position, the switching gear 104a is in engagement with the gear 104b. The first tensioner 103 is urged toward the pressing position by the urging force of the first urging member 103d. However, the switching gear 104a is in engagement with the gear 104b, and the gear 104b is in engagement with the gear 104c, so that the first tensioner 103 is held at the retracted position.

The rear cover 2D is held at the open position by its own weight against the urging force of the first urging member 103d. Alternatively, the rear cover 2D may include a retaining unit that engages with the main body 2 when the rear cover 2D is at the open position. The retaining unit engages with the main body 2 so that the rear cover 2D can be held at the open position against the urging force of the first urging member 103d.

Operation of Moving Rear Cover from Open Position to Closed Position

An operation of moving the rear cover 2D from the open position to the closed position will be described.

The rear cover 2D is moved from the open position toward the closed position by a user's operation. At that time, the first tensioner 103 is rotated by the urging force of the first urging member 103d, and the urging force of the first urging member 103d is transmitted to the rear cover 2D via the gears 104c and 104b and the switching gear 104a. This urging force acts in the direction in which the rear cover 2D moves toward the closed position. This allows the user to reduce the force to move the rear cover 2D. After the rear cover 2D reaches a predetermined position, the urging force of the first urging member 103d can be reduced to a magnitude at which the movement of the rear cover 2D can be continued without the user's operation.

As shown in FIGS. 6B, 6E, and 6F, the rear cover 2D moves close to the closed position by the urging force of the first tensioner 103.

As shown in FIG. 6E, when the rear cover 2D moves close to the closed position, the second inclined surface 2D6 of the engaging portion 2D4 comes into contact with the cover supporting end 2G of the main body 2. Since the second inclined surface 2D6 is inclined, the engaging portion 2D4 is plastically deformed, and the second inclined surface 2D6 gets over the cover supporting end 2G.

Next, as shown in FIG. 6F, after the second inclined surface 2D6 gets over the cover supporting end 2G, the first inclined surface 2D5 comes into contact with the cover supporting end 2G. The engagement between the first release gear 104a and the second release gear 104b is released, so that the transmission of the driving force from the first tensioner 103 is blocked.

When the first engaging slope (drawing portion) 2D5 comes into contact with the cover supporting end 2G of the main body 2, the rear cover 2D is urged in the closing direction by the elastic force of the engaging portion 2D4.

As shown in FIGS. 6C and 6G, since the engaging portion 2D4 engages with and is held at the cover supporting portion 2F of the main body 2, the rear cover 2D is held at the closed position.

As illustrated above, when the rear cover 2D moves from the open position to the closed position, the rear cover 2D moves from the position at which the rear cover 2D is urged in the closing direction by the first tensioner 103 to the position at which the first inclined surface 2D5 comes into contact with the cover supporting end 2G of the main body 2.

Advantageous Effects of this Embodiment

As described above, as in the first embodiment, moving the rear cover 2D from the closed position to the open position causes the first tensioner 103 to move to the retracted position away from the first belt 101.

This releases the tension acting on the first belt 101. This therefore reduces the user' operating force for removing the sheet S, when jammed, thereby preventing the sheet S from being damaged or the like.

With the configuration of this embodiment, when the rear cover 2D moves from the open position to the closed position, the rear cover 2D is urged toward the closed position by the urging force of the first tensioner 103 and the elastic force of the engaging portion 2D4. This reduces the user's operating force and prevents the rear cover 2D from being imperfectly closed.

Other Configuration

In this embodiment, when the rear cover 2D is at the closed position, the switching gear 104a and the gear 104b are out of engagement with each other. However, when the rear cover 2D is at the closed position, the switching gear 104a and the gear 104b may be in engagement with each other. In this case, the engaging portion 2D4 may be omitted.

Third Embodiment

A third embodiment will be described. A description of a configuration of an image forming apparatus 1 according to the third embodiment similar to the configurations of the first and second embodiments will be omitted.

Configuration for Releasing Belt Stretch

Referring to FIGS. 7A to 7C, a configuration for reducing the tension of the first belt 101 of the third embodiment will be described.

The image forming apparatus 1 according to this embodiment uses, as a moving member for moving the first tensioner 103 from the pressing position toward the retracted position, a release link (a link member) 105a connected to the rear cover 2D and the first tensioner 103.

FIGS. 7A, 7B, and 7C are diagrams illustrating the configuration for reducing the tension of the first belt 101 of the first belt driving section 100 according to this embodiment. FIG. 7A illustrates a state in which the rear cover 2D is at the closed position. FIG. 7B illustrates a state in which the rear cover 2D is at a position between the closed position and the open position. FIG. 7C illustrates a state in which the rear cover 2D is at the open position.

The rear cover 2D and the first tensioner 103 connect to the release link 105a. The release link 105a connects, at one end, to a release link center 105b provided at the rear cover 2D and is rotatable about the release link center 105b. The release link 105a has, at the other end, a release link long hole 105c, in which a first protrusion 103i of the first supporting member 103a of the first tensioner 103 is inserted.

In this embodiment, one end of the first urging member 103d is attached to the first protrusion 103i, and the other end of the first urging member 103d is attached to the first attaching portion 103e of the main body 2.

The first tensioner 103 includes a first belt holding portion 103g.

The first belt 101 is stretched between the first belt holding portion 103g and the first roller 103c. The main body 2 includes a belt regulator 2H for regulating the position of the first belt 101 when the tension of the first belt 101 is released. The first belt holding portion 103g and the belt regulator 2H are disposed outside the loop shape of the first belt 101.

As shown in FIG. 7A, when the rear cover 2D is at the closed position, the first tensioner 103 is at the pressing position, and the first protrusion 103i is out of contact with an end of the release link long hole 105c. In this state, the first urging member 103d attached to the first protrusion 103i and the first attaching portion 103e is on the right of the first rotation center 103b of the first supporting member 103a in the drawing. This causes the first supporting member 103a of the first tensioner 103 to be urged so as to rotate clockwise Rcw about the first rotation center 103b. In this state, the first tensioner 103 is at the pressing position, so that the first belt 101 is under tension.

As shown in FIG. 7B, when the rear cover 2D moves from the closed position to the open position, an end of the release link long hole 105c comes into contact with the first protrusion 103i, so that the first tensioner 103 is drawing by the release link 105a to rotate toward the retracted position. As the first tensioner 103 rotates, the first roller 103c is separated from the first belt 101.

As shown in FIG. 7C, when the rear cover 2D is at the open position, the first urging member 103d attached to the first protrusion 103i and the first attaching portion 103e is on the left of the first rotation center 103b in the drawing. This causes the first supporting member 103a of the first tensioner 103 to be urged so as to rotate counterclockwise Rccw about the first rotation center 103b. At that time, the first protrusion 103i comes into contact with an abutting portion of the main body 2, so that the first supporting member 103a is held at the retracted position.

With the configuration of this embodiment, when the first tensioner 103 is at the pressing position, the first urging member 103d urges the first supporting member 103a so that the first tensioner 103 is pressed toward the pressing position. When the first tensioner 103 is at the retracted position, the first urging member 103d urges the first supporting member 103a so that the first tensioner 103 is pressed toward the retracted position. The direction in which the first urging member 103d urges the first supporting member 103a is switched when the first tensioner 103 moves between the pressing position and the retracted position.

In the process in which the rear cover 2D is moved from the open position to the closed position, an end of the release link long hole 105c comes into contact with the first protrusion 103i to move the first tensioner 103 toward the pressing position. When the first urging member 103d attached to the first protrusion 103i and the first attaching portion 103e reaches the right of the first rotation center 103b of the first supporting member 103a in the drawing, the first supporting member 103a is rotated by the first urging member 103d. As a result, the first protrusion 103i is separated from the end of the release link long hole 105c into the state illustrated in FIG. 7A.

Next, the first belt holding portion 103g and the belt regulator 2H will be described. When the first tensioner 103 is separated from the first belt 101, so that the tension acting on the first belt 101 is released, the first belt 101 tends to return to the circular shape.

When the first belt 101 becomes nearly circular, the first belt 101 may not separate from the pinion gear 81a. For this reason, when the first tensioner 103 is at the retracted position, and the first belt 101 tends to return to the circular shape, the first belt holding portion 103g and the belt regulator 2H come into contact with the outside of the first belt 101. Nipping the first belt 101 between the first belt holding portion 103g and the belt regulator 2H prevents the first belt 101 from returning to the circular shape. This ensures that the first belt 101 is separated from the pinion gear 81a.

Advantageous Effects of this Embodiment

As in the first and second embodiments, moving the rear cover 2D from the closed position to the open position causes the first tensioner 103 to move to the retracted position away from the first belt 101, as described above. This releases the tension acting on the first belt 101. This therefore reduces the user' operating force for removing the sheet S, when jammed, thereby preventing the sheet S from being damaged or the like.

Fourth Embodiment

A fourth embodiment will be described. A description of a configuration of an image forming apparatus 1 according to the fourth embodiment similar to the configurations of the first to third embodiments will be omitted.
Configuration for Releasing Belt Stretch Referring to FIGS. 8A to 8C, a configuration for reducing the tension of the first belt 101 of the fourth embodiment will be described.

The image forming apparatus 1 according to this embodiment includes a detector 91 for detecting the sheet S and uses an actuator 140 as a moving member for moving the first tensioner 103 from the pressing position toward the retracted position.

Figure 8A:
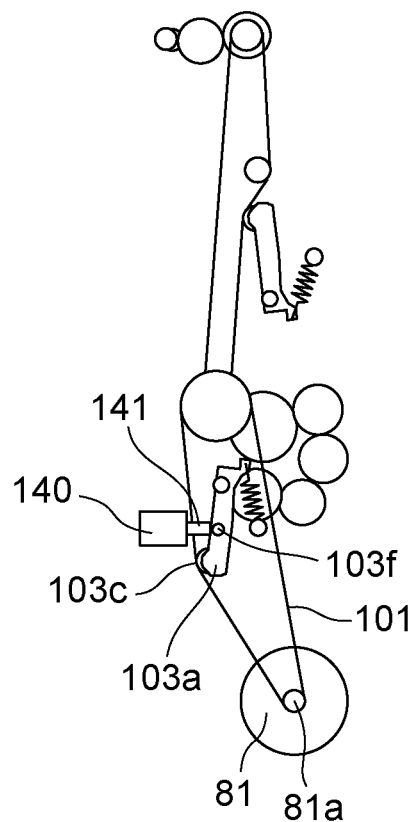
FIGS. 8A to 8C are diagrams illustrating a configuration for reducing the tension of the first belt according to a fourth embodiment.
Figure 8B:
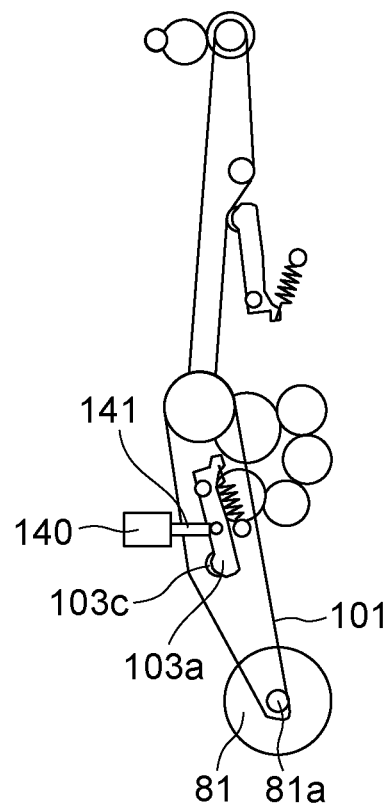
Figure 8C:
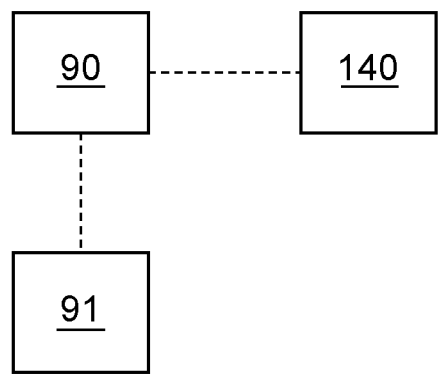

FIGS. 8A, 8B, and 8C are diagrams illustrating the configuration for reducing the tension of the first belt 101 of the first belt driving section 100 according to this embodiment. FIG. 8A illustrates a state in which the first tensioner 103 is at the pressing position. FIG. 8B illustrates a state in which the first tensioner 103 is at the retracted position. FIG. 8C illustrates the relationship among the detector 91, the control unit 90, and the actuator 140.

Referring to FIGS. 8A and 8B, the actuator 140 connects to the first supporting member 103a of the first tensioner 103 via a movable shaft 141.

In this embodiment, the actuator 140 is a solenoid. When the actuator 140 is supplied with no electric power, the first tensioner 103 is located to the pressing position by the urging force of the first urging member 103d, as shown in FIG. 8A.

When the actuator 140 is supplied with electric power, the actuator 140 moves the first tensioner 103 to the retracted position via the movable shaft 141, as shown in FIG. 8B. In this state, the first tensioner 103 is separated from the first belt 101 to release the tension of the first belt 101.

The detector 91 can detect whether an abnormality in the conveyance of the sheet S has occurred.

Examples of the detector 91 include a sensor that optically detects the sheet S and a sensor that detects movement of a flag due to the sheet S.

The control unit 90 of the image forming apparatus 1 controls the operation of the actuator 140. When the sheet S is jammed, and an abnormality in the conveyance of the sheet S is detected by the detector 91, the actuator 140 moves the first tensioner 103 from the pressing position toward the retracted position. This allows the tension exerted on the first belt 101 to be released.

Advantageous Effects of this Embodiment

As in the first to third embodiments, moving the rear cover 2D from the closed position to the open position causes the first tensioner 103 to move to the retracted position away from the first belt 101, as described above. This releases the tension acting on the first belt 101. This therefore reduces the user' operating force for removing the sheet S, when jammed, thereby preventing the sheet S from being damaged or the like.
Modification 1

Figure 9A:
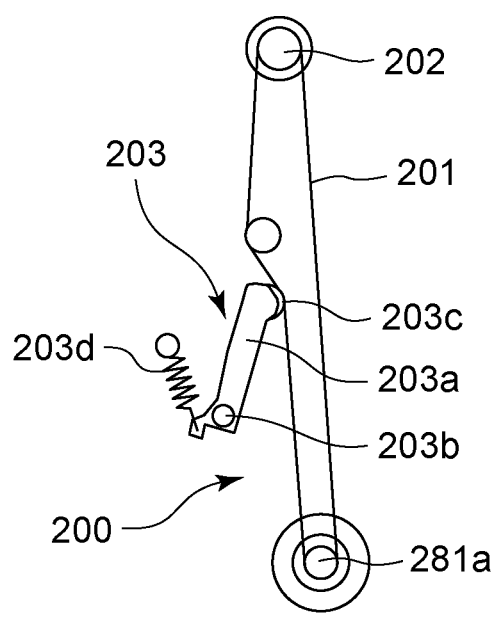
FIGS. 9A and 9B are diagrams illustrating a configuration for reducing the tension of a first belt according to Modification 1.
Figure 9B:
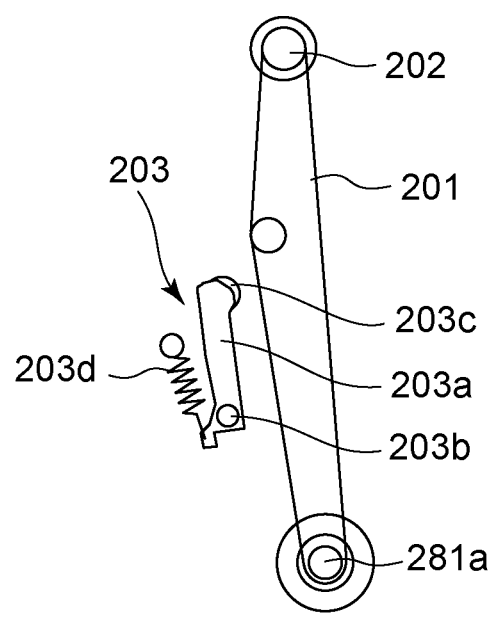

Modification 1 will be described. A description of a configuration of an image forming apparatus 1 according to Modification 1 similar to the configurations of the first to fourth embodiments will be omitted.
Configuration for Reducing Tension of First Belt Referring to FIGS. 9A and 9B, a configuration for reducing the tension of a first belt 201 of Modification 1 will be described. FIGS. 9A and 9B are diagrams illustrating the configuration for reducing the tension of the first belt 201 of a first belt driving section 200 according to this modification. FIG. 9A illustrates a state in which a first tensioner 203 is at the pressing position. FIG. 9B illustrates a state in which the first tensioner 203 is at the retracted position.

The image forming apparatus 1 according to Modification 1 includes the first belt 201, the first tensioner 203, a pinion gear 281a driven by the first driving motor 81, and a first pulley 202. The first belt 201, the first tensioner 203, the pinion gear 281a, and the first pulley 202 correspond to the first belt 101, the first tensioner 103, the pinion gear 81a, and the first pulley 102 of the first to fourth embodiments, respectively.

The first tensioner 203 includes a first supporting member (a first arm) 203a, a first roller (a first pressing unit) 203c rotatably supported by the first supporting member 203a, and a first urging member 203d that urges the first supporting member 203a. The first supporting member 203a is rotatable about a first rotation center 203b.

In the first to fourth embodiments, the first tensioner 103 is disposed inside the loop of the first belt 101. However, the present disclosure is not limited thereto. As in this modification, the first tensioner 203 may be disposed outside the first belt 201. Also with this configuration, the tension exerted on the first belt 201 can be released by moving the first tensioner 203 from the pressing position (FIG. 9A) to the retracted position (FIG. 9B).

A moving member for moving the first tensioner 203 may be equivalent to the moving members illustrated in the first to fourth embodiments. In other words, moving the rear cover 2D from the closed position to the open position causes the first tensioner 203 to move to the retracted position and is separated from the first belt 201, as in the first to fourth embodiments. Thus, the tension acting on the first belt 201 is released. This allows the user's operating force for removing the sheet S, when jammed, to be reduced, preventing damage or the like to the sheet S.

Modification 2

Modification 2 will be described. A description of a configuration of an image forming apparatus 1 according to Modification 2 similar to the configurations of the first to fourth embodiments and Modification 1 will be omitted.

Configuration for Reducing Tension of First Belt

Figure 10A:
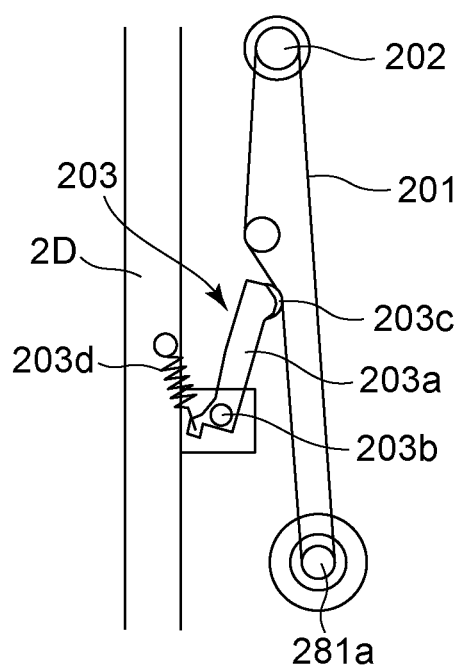
FIGS. 10A and 10B are diagrams illustrating a configuration for reducing the tension of the first belt according to Modification 2.
Figure 10B:
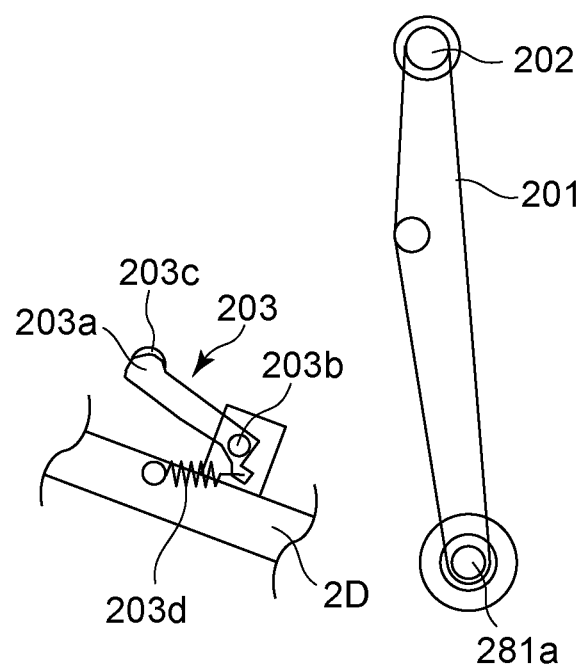

Referring to FIGS. 10A and 10B, a configuration for reducing the tension of the first belt 201 of Modification 2 will be described. FIGS. 10A and 10B are diagrams illustrating the configuration for reducing the tension of the first belt 201 of the first belt driving section 200 according to this modification. FIG. 10A illustrates a state in which the rear cover 2D is at the closed position, and the first tensioner 203 is at the pressing position. FIG. 10B illustrates a state in which the rear cover 2D is at the open position, and the first tensioner 203 is at the retracted position.

In the first to fourth embodiments and Modification 1, the first tensioner 103 is provided at the main body 2. However, the present disclosure is not limited thereto. As in this modification, the rear cover 2D may include the first tensioner 103. Also with this configuration, the tension exerted on the first belt 201 can be released by moving the rear cover 2D from the closed position to the open position to move the first tensioner 203 from the pressing position to the retracted position.

In other words, in this modification, the first tensioner 203 is provided at the rear cover 2D, and the rear cover 2D functions as a moving member that moves the first tensioner 203 from the pressing position to the retracted position. As shown in FIGS. 10A and 10B, the first tensioner 203 moves from the pressing position to the retracted position in conjunction with the movement of the rear cover 2D from the closed position to the open position.

In other words, as in the first to fourth embodiments, moving the rear cover 2D from the closed position to the open position causes the first tensioner 203 to move to the retracted position and is separated from the first belt 201. Thus, the tension acting on the first belt 201 is released. This allows the user's operating force for removing the sheet S, when jammed, to be reduced, preventing damage or the like to the sheet S.

Other Modifications

Although the embodiments describe image forming units that employ an electrophotographic image forming process as examples of an image forming unit that forms images on the sheets S, the present disclosure is not limited to the ones described above. Another example of the image forming unit that forms images on the sheets S is an image forming unit that employs an ink-jet image forming process of forming images by discharging an ink solution from nozzles.

Although the embodiments describe color laser printers that form multiple-color images on the sheets S, the present disclosure is not limited to the ones described above. Another example is a monochrome laser printer that forms monochrome images on the sheets S.

Although the embodiments describe image forming apparatuses that form images on the sheets S, the present disclosure is not limited to the ones described above. Other examples include an automatic document feeder (ADF) capable of automatically feeding documents and a post-processing apparatus that post-processes the sheets S.

The configurations of the first to fourth embodiments and Modifications 1 and 2 may be combined as needed. For example, the rear door 2D of the first to fourth embodiments and Modifications 1 and 2 may include the engaging portion 2D4.

The first belt holding portion 103g and the belt regulator 2H in the third embodiment may also be used in the first and second embodiments, for example. The first belt holding portion 103g in the third embodiment is configured to move together with the first tensioner 103. Instead of the first belt holding portion 103g, a belt holding portion may be provided at the main body 2. In this case, when the first tensioner 103 is at the pressing position, the belt holding portion and the first belt 101 may be separated from each other to release the tension of the first belt 101, and when the first belt 101 tends to return to the circular shape, the belt holding portion and the first belt 101 may come into contact with each other. This configuration can be combined with the configurations of the first, second, and fourth embodiments and Modifications 1 and 2.

In the embodiments, the first tensioners 103 and 203 are moved to the retracted position by the moving member. Alternatively, the second tensioner 115 may be moved to the retracted position. This configuration prevents transmission of an external force from the reversing roller pair 61 to the first motor 81. A moving member may be used to move the first tensioners 103 and 203 to the retracted position, and the second tensioner 115 to the retracted position. Since the first belt 101 is configured to transmit the driving force to a plurality of conveying units. This configuration allows coping with a sheet jam in a wider area by moving the first tensioners 103 and 203 to the retracted position.

The present disclosure can reduce tension exerted on a belt that transmits a driving force to a sheet conveying unit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-101534, filed Jun. 24, 2022, which is hereby incorporated by reference herein in its entirety.

What is claimed is:

1. A sheet conveying apparatus comprising:
   a conveying unit configured to convey a sheet;
   a casing including a conveying path through which the sheet passes;
   a cover configured to move between a closed position at which the conveying path is covered and an open position at which the conveying path is exposed;
   a drive source configured to drive the conveying unit;
   a drive transmission unit including a drive transmission belt and a rotatable member configured to engage with the drive transmission belt, wherein the drive transmission unit is configured to transmit a driving force of the drive source to the conveying unit via the drive transmission belt and the rotatable member;

a tensioner configured to move between a pressing position at which the drive transmission belt is pressed and a retracted position retracted from the pressing position; and a moving member configured to move the tensioner from the pressing position toward the retracted position, wherein a magnitude of tension exerted on the drive transmission belt is lower when the tensioner is at the retracted position than when the tensioner is at the pressing position, and wherein the moving member moves the tensioner from the pressing position toward the retracted position in conjunction with movement of the cover from the closed position to the open position.

2. The sheet conveying apparatus according to claim 1, wherein, when the conveying unit undergoes an external force with the tensioner at the retracted position, one of the drive transmission belt and the rotatable member receives the external force and is rotatable ahead of another of the drive transmission belt and the rotatable member.

3. The sheet conveying apparatus according to claim 1, wherein, when the tensioner moves from the pressing position to the retracted position, an area of contact between the drive transmission belt and the rotatable member decreases.

4. The sheet conveying apparatus according to claim 1, wherein the moving member includes a pressing unit provided at the cover and configured to press the tensioner so as to move the tensioner from the pressing position toward the retracted position when the cover moves from the closed position to the open position.

5. The sheet conveying apparatus according to claim 4, wherein, the pressing unit is separated from the tensioner with the cover at the closed position.

6. The sheet conveying apparatus according to claim 1, wherein the moving member includes a drive train connected to the cover and the tensioner and configured to transmit a force generated by movement of the cover to the tensioner.

7. The sheet conveying apparatus according to claim 1, wherein the moving member includes a link member connected to the cover and the tensioner.

8. The sheet conveying apparatus according to claim 1, wherein the cover is configured to receive an urging force from the tensioner at a position between the closed position and the open position.

9. The sheet conveying apparatus according to claim 8, wherein the cover includes an engaging portion configured to engage with the casing when the cover is at the closed position, wherein the engaging portion includes a drawing portion that is configured to come into contact with the casing to urge the cover in a closing direction, and wherein, in a process in which the cover moves from the open position to the closed position, the cover is moved from a position at which the cover receives an urging force in the closing direction from the tensioner to a position at which the drawing portion comes into contact with the casing.

10. The sheet conveying apparatus according to claim 1, further comprising a detector configured to detect the sheet, wherein the moving member includes an actuator configured to move the tensioner, and, when an abnormality in conveyance of the sheet is detected by the detector, the actuator moves the tensioner from the pressing position to the retracted position.

11. The sheet conveying apparatus according to claim 1, wherein the tensioner is provided at the cover and the cover functions as the moving member.

12. An image forming apparatus comprising:

an image forming unit; and a sheet conveying apparatus that includes:

a conveying unit configured to convey a sheet, a casing including a conveying path through which the sheet passes, a cover configured to move between a closed position at which the conveying path is covered and an open position at which the conveying path is exposed, a drive source configured to drive the conveying unit, a drive transmission unit including a drive transmission belt and a rotatable member configured to engage with the drive transmission belt, wherein the drive transmission unit is configured to transmit a driving force of the drive source to the conveying unit via the drive transmission belt and the rotatable member, a tensioner configured to move between a pressing position at which the drive transmission belt is pressed and a retracted position retracted from the pressing position, and a moving member configured to move the tensioner from the pressing position toward the retracted position, wherein a magnitude of tension exerted on the drive transmission belt is lower when the tensioner is at the retracted position than when the tensioner is at the pressing position, and wherein the moving member moves the tensioner from the pressing position toward the retracted position in conjunction with movement of the cover from the closed position to the open position.

13. The image forming apparatus according to claim 12, wherein, when the tensioner moves from the pressing position to the retracted position, an area of contact between the drive transmission belt and the rotatable member decreases.

14. The image forming apparatus according to claim 12, wherein the moving member includes a pressing unit provided at the cover and configured to press the tensioner so as to move the tensioner from the pressing position toward the retracted position when the cover moves from the closed position to the open position.

15. The image forming apparatus according to claim 12, wherein the moving member includes a drive train connected to the cover and the tensioner and configured to transmit a force generated by movement of the cover to the tensioner.

16. The image forming apparatus according to claim 12, wherein the moving member includes a link member connected to the cover and the tensioner.

17. The image forming apparatus according to claim 12, wherein the cover is configured to receive an urging force from the tensioner at a position between the closed position and the open position.

18. The image forming apparatus according to claim 12, further comprising a detector configured to detect the sheet, wherein the moving member includes an actuator configured to move the tensioner, and, when an abnormality in conveyance of the sheet is detected by the detector, the actuator moves the tensioner from the pressing position to the retracted position.

19. The image forming apparatus according to claim 12, wherein the tensioner is provided at the cover and the cover functions as the moving member.

20. A sheet conveying apparatus comprising:

a conveying unit configured to convey a sheet;

a drive source configured to drive the conveying unit;

a drive transmission unit including a drive transmission belt and a rotatable member configured to engage with the drive transmission belt, wherein the drive transmission unit is configured to transmit a driving force of the drive source to the conveying unit via the drive transmission belt and the rotatable member;

a tensioner configured to move between a pressing position at which the drive transmission belt is pressed and a retracted position retracted from the pressing position; and a moving member configured to move the tensioner from the pressing position toward the retracted position, wherein a magnitude of tension exerted on the drive transmission belt is lower when the tensioner is at the retracted position than when the tensioner is at the pressing position, and wherein, when the tensioner moves from the pressing position to the retracted position, an area of contact between the drive transmission belt and the rotatable member decreases.

\* \* \* \* \*